United States Patent [19]

Aoki

[11] 4,323,806
[45] Apr. 6, 1982

[54] MINIATURE ROTARY ELECTRIC MACHINE

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 55,558

[22] Filed: Jul. 9, 1979

[30] Foreign Application Priority Data

Nov. 2, 1978 [JP] Japan .................................. 53/135205

[51] Int. Cl.$^3$ .............................................. H02K 1/22
[52] U.S. Cl. ..................................... 310/266; 310/154
[58] Field of Search .................................. 310/266, 154

[56] References Cited

U.S. PATENT DOCUMENTS 4,103,196 7/1978 Saito et al. .......................... 310/266

*Primary Examiner*—Donovan F. Duggan

*Attorney, Agent, or Firm*—Fitzpatrick, Cella, Harper & Scinto

[57] ABSTRACT

The present invention relates to a miniature rotary electric machine and more particularly to a coreless type of rotary electric machine. The coreless rotary electric machine includes a rotor coil formed as a coil body in a form of cup with its one end being open. The coil body has, on its circumference, a coil part wound with a predetermined inclination. An end connection wire part is provided to make a connection between adjacent windings only at the one side end of the inclined coil part so that each two adjacent windings of the inclined coil part are connected each other successively by the end connection wire part. According to a feature of the present invention, the inclined coil part and the end connection wire part are formed by coil assembly portions each comprising a plural number of groups of windings turned at the same position in layers with the same number of turns. The coil assembly portions form together a coil assembly of large winding capacity.

2 Claims, 19 Drawing Figures

MINIATURE ROTARY ELECTRIC MACHINE

BACKGROUND OF THE INVENTION

1. Field of the Invention

The present invention relates to a miniature direct current rotary electric machine.

2. Description of the Prior Art

In order to improve the efficiency of a miniature direct current rotary machine it has been proposed to use a coreless rotor therein. As such coreless rotor there have been already known and used various rotors in a form of drug-cup. Since the rotor is consituted of a coil having no iron core therein, it has many advantages that there is produced no hysteresis loss by alternate changes of magnetic flux; eddy-current loss at the side of stator is small and as a whole there is no need of worrying about iron loss or core loss.

On the other hand, however, these types of known rotary machines involve some problems in forming the coils in particular when they should be designed to satisfy specific requirements such as revolution number suitable for specific applications thereof.

For example, according to one of the known methods of winding coreless rotary coils, a plurality of curved rectangular coil elements are disposed on a rotary shaft with their centers being aligned with the center of the rotary shaft so as to form a cylindrical body. These elements assembled into a cylinder in this manner are then fixed together by a suitable bonding material such as synthetic resin applied to the circumference of the formed cylindrical body which gives a rotary coil body. This rotary coil body is relatively large in coil thickness in the direction normal to the length of the rotary shaft. Because of the large thickness, there is caused a shortage of gap magnetic flux density which produces a problem of coarse revolution.

According to another known winding method, inclined coil elements wound on a cylinder are assembled into a cylindrical body by connecting the elements at their both ends successively from field pole to field pole without any end connnection wire part between adjacent windings. The coil elements thus assembled into a cylindrical body are then fixed together by a suitable bonding material such as synthetic resin to form a rotary coil body. This coil body has a relatively small coil thickness in the direction normal to the length of the rotary shaft. However, when the coil body is desired to have a short axial length to give a flattened shape of coil, there arises a problem. The problem is that the breadth of windings, that is, the number of active conductors, is severely limited with the decrease of the angle of inclination of the active coil interlinking with magnetic flux.

To solve the above problems involved in the first and second winding systems according to the prior art, we have already proposed an improved type of coreless rotary coil body in a form of cup. The coil body comprises a coil part inclined with a predetermined angle of inclination on the circumference of the coil body and an end connection part disposed to make a connection between adjacent windings of the coil part only at one side end of the inclined coil part. This system of winding enables one to improve the rate of winding and increase the number of active conductors while reducing the resistance of winding (armature resistance). This improvement is the subject of a prior application filed by the assignor of the present invention and published as Japanese Patent Application Publication No. 22361/1974.

In designing a coreless type of direct current motor with a cup-shaped rotary armature it is essential to suitably select the direct current resistance R, the number of active conductors Z and the active magnetic flux $\Phi$ for the armature whose field system is a permanent magnet. As well known in the art, iron loss (core loss), copper loss (ohmic loss) and mechanical loss constitute three important losses in direct current motors. If the rotor is formed as a coreless one, then the hysteresis loss caused by the alternate change of magnetic flux is eliminated and also the eddy-current loss occurring at the side of the stator becomes negligibly small. It is no longer necessary, as a whole, to take the iron loss into account. Furthermore, by using a coreless structure, the reactance voltage usually generated in the coil at the time of commutation can be reduced to the lowest level and therefore nearly ideal commutation is attainable which gives the commutating mechanism an improved stability and an extended useful life.

For the above mentioned type of motors, the following pure equation of motor circuit in which no iron loss is taken into consideration holds well:

$$I_aV - I_a^2R = I_aE_c \ldots \quad (1)$$

wherein,
V = terminal input voltage,
Ia = armature current,
Ec = back electromotive voltage and
R = Ra + Rb in which
  Ra = armature resistance and
  Rb = brush contact resistance.

Therefore, a larger output $I_aE_c$ can be obtained by reducing the ohmic loss $I_a^2R$ to a smaller value relative to the input $I_aV$. This means that a motor of very high efficiency can be made by a proper control of the mechanical loss contained in $I_aE_c$.

However, there are some applications of motor for which the motor has to be designed to satisfy particular requirements regarding revolution number and other properties. In such case, a particular technique is required by which the actual values of R, Z and $\Phi$ can be determined most suitably for the aimed purpose.

Figures 1, 2:
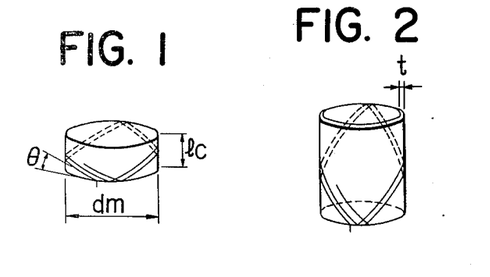
FIGS. 1 and 2 schematically show examples of cup-shaped coil formed according to the prior art.
Figure 3:
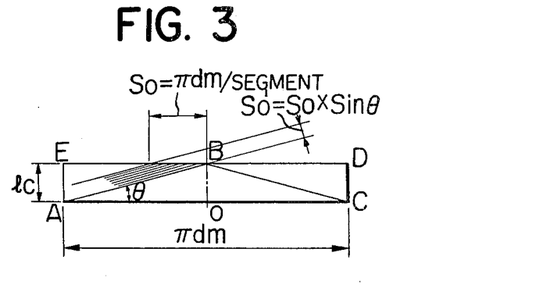

Techniques for forming a cylindrical, cup-shaped coil without any end connection at its both ends are disclosed, for example, in Japanese Patent Application Publication No. 2151/1963, U.S. Pat. No. 3,360,668 and DAS No. 1,188,709. One example of such cup-shaped coil is shown in FIG. 2. There may be the case wherein a coil in a form of flattened cup as shown in FIG. 1 should be designed employing the technique used for the coil of FIG. 2 which has a larger axial length than that in FIG. 1. However, the use of the known technique as mentioned above for making such a flat cup-shaped coil as shown in FIG. 1 has some difficulty. The inclination $\theta$ of the active coil interlinking with the magnetic flux in FIG. 1 is smaller than that in FIG. 2. As shown in FIG. 3, when the inclination $\theta$ is small, a limitation is put on the width of coil segment So' by which the number of active conductors is determined. The limitation is sharply enhanced with the reduction of the inclination $\theta$.

In FIG. 3, the symbol So is a quotient given by dividing the length of circumference of the rotor by the number of commutator segments. Therefore, So means coil width per segment and the number of windings which can be wound within the width of So corresponds to the number of coils which can be wound in one slot on an iron core. Even when coils have the same width of So, the width So' within which the coil can be really wound may be different from each other. Since SO'=So·sin θ, the width So' varies depending upon the inclination of coil θ. Of course, θ must be constant for one coil. If it varies from one place to another in one and same coil, So' will be limited by the smallest inclination θ in the coil. In this sense, the locus of coil turn must describe a spiral with a constant inclination on the cylindrical surface of the armature. To receive the effective number of conductors in the width So', the diameter of wire to be wound is decreased with the decrease of the axial length (cup depth) for the same diameter dm of armature. Thereby, the armature resistance Ra in the above equation (1) is increased and therefore the ohmic loss is increased which reduces the efficiency of the motor.

Figure 4:
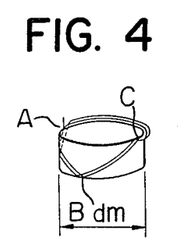

FIG. 4 shows one example of a coil disclosed in the above mentioned our prior application Japanese Patent Application Publication No. 22361/1974. As the coil body has an end connection part provided only at its one side, the inclination of coil winding wound on a cylindrical surface, that is, the angle θ can be selected at will. When the axial length of the cup-shaped coil is reduced, the inclination θ of the active coil winding part is not reduced in proportion to the reduction of axial length but is set to an optimum value obtained by a calculation of the three important factors, armature resistance Ra, number of active conductors Z and total active magnetic flux Φ. Therefore, the severe limitation concerning the width So' described above can be moderated to prevent the increase of armature resistance Ra when a flat cup-shaped coil is used.

When the flat cup-shaped coil shown in FIG. 1 is compared with that shown in FIG. 4 in respect to the resistance Ra, it is found that Ra for the former is 2.23 Ω and that for the latter is 0.66Ω provided that for both the coils, dm (average diameter)=29.4 mm, lc(coil height)=18 mm, tthe number of commutator segments=5 and the number of active conductors Z=240 lines.

Figure 5:
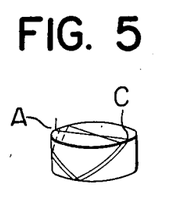

In case of the cup-shaped coil body shown in FIG. 4 for which the above calculation was made, the turn-back points A and C are set at the positions of πdm/2, that is, the positions opposed to each other at 180° and the segment $\overline{AC}$ of winding extends along the upper edge of the cup. But, this can be modified as shown in FIG. 5. In the modification shown in FIG. 5, the segment $\overline{AC}$ of the winding extends straightly or almost straightly to form a chord of the circular upper edge of the cup serving as an end connection part. Employing the modification of FIG. 5, a further reduction of the resistance Ra can be attained without any reduction of the effective values of Z and Φ. To demonstrate this, $\overline{ABCA}$=10.4 cm and Ra=0.66Ω for the FIG. 4 example are compared with the data $\overline{ABCA}$=9.2 cm and Ra=0.59Ω for the FIG. 5 example. Compared with the conventional cup-shaped coil body shown in FIG. 1, the armature resistance Ra is reduced to ¼.

As shown in the above, the invention of Japanese Patent Application Publication No. 22361/1974 was directed primarily to analyze R and Z of the three important factors. A further development of the invention has led us to the finding that the area of the coil intersecting the magnetic flux can be increased or decreased as desired by suitably selecting the positions of end connection. This finding has been disclosed in detail in German laying-upon print DT-OS No. 2,126,199. Namely, it has been found that the turn-back points A and C mentioned above are not always necessary to lie on the diameter of the cup, that is, at such positions corresponding to πdm/2, but the inclination θ can be decreased or increased according to the extent to which the cup should be flattened.

Figure 8:
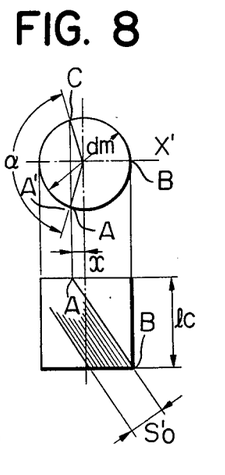

In the above calculation of armature resistance Ra, such case was shown in which the end connection positions lie on the dimeter of the cup (FIG. 5). The end connection positions may be shifted as seen in FIG. 8. In FIG. 8, if the position of x is displaced in the negative direction relative to X—X' axis, one can find out such position in which the area of coil becomes maximum as later shown by a numerical calculation. On the contrary, if the position x is displaced in the direction of the positive side of the X—X' axis, then the winding rate will be further improved although the area of coil will be decreased.

Figure 6:
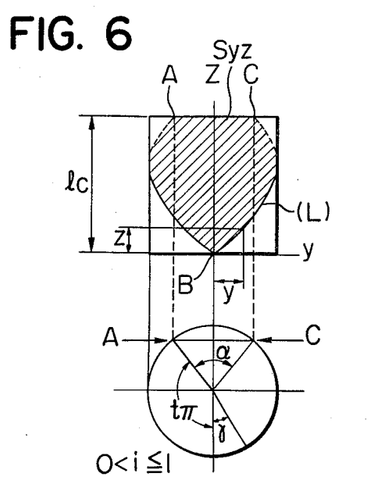
FIG. 6 shows the relation between coil orthogonal projection area and an end connection for the FIG. 5 coil.

The following description explains the manner of how to find out the position in which the area of coil is maximum:

It is known that the quantity of any one axis component of moment generated in a closed circuit, when the closed circuit formed by any closed curve is placed in a parallel magnetic field, is in proportion to the area of orthogonal projection of the closed circuit on a plane extending parallel with the axis and the direction of the magnetic field. FIG. 6 shows the relation between the orthogonal projection coil area and the position of the end connection for a coil as shown in FIGS. 5 and 8. The central angle α to the end connection length AC is referred to as end connection angle which may be either α (narrow angle) or 2π−α (wide angle). In this case, the area of coil given as follows:

As curve L is a spiral line, let k denote the tangent to the inclination of the spiral L. γ is the angle shown in FIG. 6 which indicates the position of winding by an angular coordinate of cylindrical coordinate system. Then, $$z = r\gamma k \ldots \quad (1)$$

and $$y = r \sin \gamma = r \sin (z/rk) \ldots \quad (2).$$

Formula (2) indicates that the orthogonal projection of spiral (L) is a sine curve. Torque T(t) generated in one coil winding is given as follows by a numerical calculation through many transformations of the formula not shown:

$$T(t) \max = 1.45 \, rlBI \ldots \quad (3)$$

wherein, B is gap magnetic flux density in gauss and I is electric current in ampere. In the shown case, α=92.92°∼92.94°≈93°.

Figure 7:
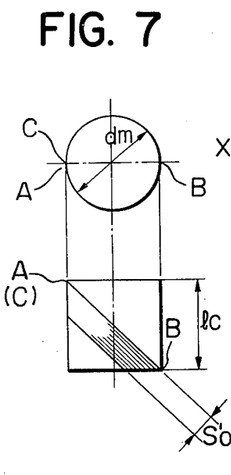
FIGS. 7 and 8 show the manner of coil winding on the coil shown in FIG. 5.

Since the case shown in FIG. 7 corresponds to such case in which t=1 in FIG. 6, there is given:

$$T(1) = 1.27 \, rlBI \ldots \quad (4)$$

Let t=½ (end connection lies on the diameter of the cup), then, $$T(\tfrac{1}{2}) = 1.27 \, rlBI \ldots \quad (5).$$

Thus, the area of coil obtained is the same for the two cases. But, since $\theta$ is larger in case (5) than in case (4), it is seen that the case (5) is more advantageous than the case (4) with respect to winding rate.

In summary, it may be said that for a cup-shaped armature coil there is obtained a freedom in selection of the values of R, Z and $\Phi$ by providing an end connection at one side end, without any loss of structural functions as a cup-shaped rotor. However, practice, this can be realized only when there is established a useful method by which a conductor wire can be wound in many turns orderly and prefectly in accordance with the above principle. Otherwise, it is impossible to wind a given number of wires having a given wire diameter into a coil of predetermined thickness. Especially, there may often occur such trouble that the crossed parts of wires are crushed by the pressing pressure applied to the parts at the coil thickness shaping step after winding and thereby a rare short is caused.

Figure 9:
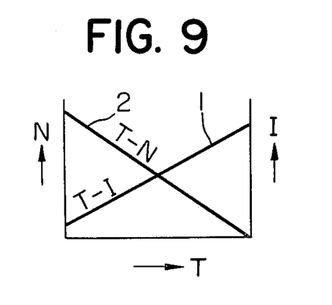
FIG. 9 is a characteristic curve of a motor having a magnet field system.

FIG. 9 is a typical characteristic curve of a direct current motor having a field system of magnet. In FIG. 9, the abscissa is torque T and the ordinate is current I for curve 1 and revolution number N for curve 2. Let K denote the torque constant and m the revolution number separation characteristic constant which is a reciprocal of ratio of the change $\Delta n$ of revolution number N to a torque change $\Delta T$, then, $$K = \Delta T/\Delta I \text{ and } m = \Delta T/\Delta n$$

wherein, $\Delta I$ is change of current I for a certain change of torque $\Delta T$.

As to the constant m, it is also known that it is in proportion to the square of K and is in reciprocal proportion to the resistance R between motor terminals ($m \sim K^2/R$). Therefore, if applied voltage V becomes known, all the factors such as torque required for the motor, its revolution number N, driving current I, suspension constant m and starting torque can be determined by the values of torque constant K and resistant R.

Regarding the torque constant K, it is also known that it is in proportion to the product of number of active conductors Z multiplied by total active magnetic flux $\Phi$ ($K \sim Z\Phi$). This means that it is essential to properly select the values of Z and $\Phi$ in designing a motor for obtaining the desired output of revolution torque. On the other hand, in order to minimize the production cost of the motor, it is required to use an inexpensive magnet such as that of barium-ferrite system instead of an expensive alnico magnet as the field magnet in the motor. To satisfy the requirement concerning the production cost, it is inevitable that $\Phi$ becomes small. This reduction in $\Phi$ must be compensated by increasing Z, the active conductor lines per segment. In this case, to maintain a certain necessary value of m it is required to satisfy the condition that the resistance R should not be increased with the increase of Z. This condition necessitates the use of such conductor wire which is low in resistance per unit length (wire of larger diameter).

Figure 10:
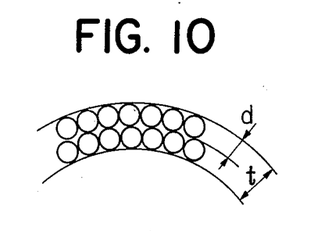
FIG. 10 is a sectional enlarged view of a coil in layers, the number of layers being an integral multiple of wire diameter.
Figure 11:
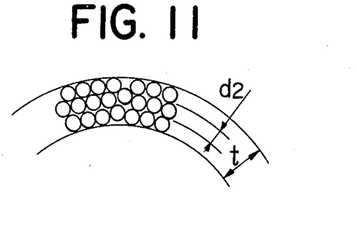
FIG. 11 is a view similar to FIG. 10 but showing another coi in an indefinite number of layers, FIG. 12 schematically shows the manner of winding in a coil according to the present invention.

For a cup-shaped coreless revolving coil, a certain number of conductors having a certain wire diameter as given by the above calculation are wound up on a cylindrical coil body in two or more layers to form a cup coil having a desired coil thickness t. However, note should be taken or the fact that a regular relation as shown in FIG. 10 is not always established between the wire diameter d used and the coil thickness t and, instead, it is often required to wind up conductor wire in an indefinite number of layers as shown in FIG. 11. In other words, according to the prior art, the coil thickness t is limited only to an integral multiple of the diameter d of wire used at that time, which is usually twice. There has not yet been known any method which enables to form a coil with any desired coil thickness independently of the wire diameter.

Among many coil winding methods hitherto known for the above mentioned type of coreless resolving coil, the method disclosed in the Japanese Patent Application Publication No. 22361/1974 is featured in that adjacent windings are conneced with each other only at the one side end of the inclined coil part wound on the coil body as shown in FIG. 5. As clearly shown in FIG. 5, every element coil is wound in such manner that the elements form the opening of a cup of their lower ends and they are turned back at the opening toward the upper edge of the cup along the cylindrical surface of the cup. At the upper edge, adjacent windings are connected with each other successively at the end connection part.

SUMMARY OF THE INVENTION

It is an object of the present invention to further improve the winding in the coreless revolving coil disclosed in the above mentioned prior art of Japanese Patent Application Publication No. 22361/1974.

It is another object of the invention to provide a novel structure of miniature rotary electric machine in which the improved winding is used.

It is a further object of the invention to provide a winding for a motor and a motor provided with the same which is higher in efficiency than those designed according to the prior art.

Other and further objects, features and advantages of the invention will appear more fully from the following description of embodiments with reference to the accompanying drawing.

BRIEF DESCRIPTION OF THE DRAWINGS

FIG. 3 is an expanded view of the coil shown in FIG. 1, FIGS. 4 and 5 are schematic views similar to FIGS. 1 and 2 but showing the manner of coil winding according to the prior art disclosed in Japanese Patent Application Publication No. 22361/1974.

DESCRIPTION OF THE PREFERRED EMBODIMENTS

Figure 12:
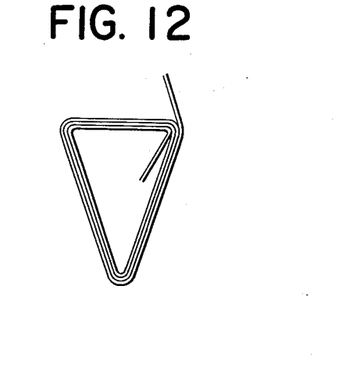
Figures 13, 15A, 15B:
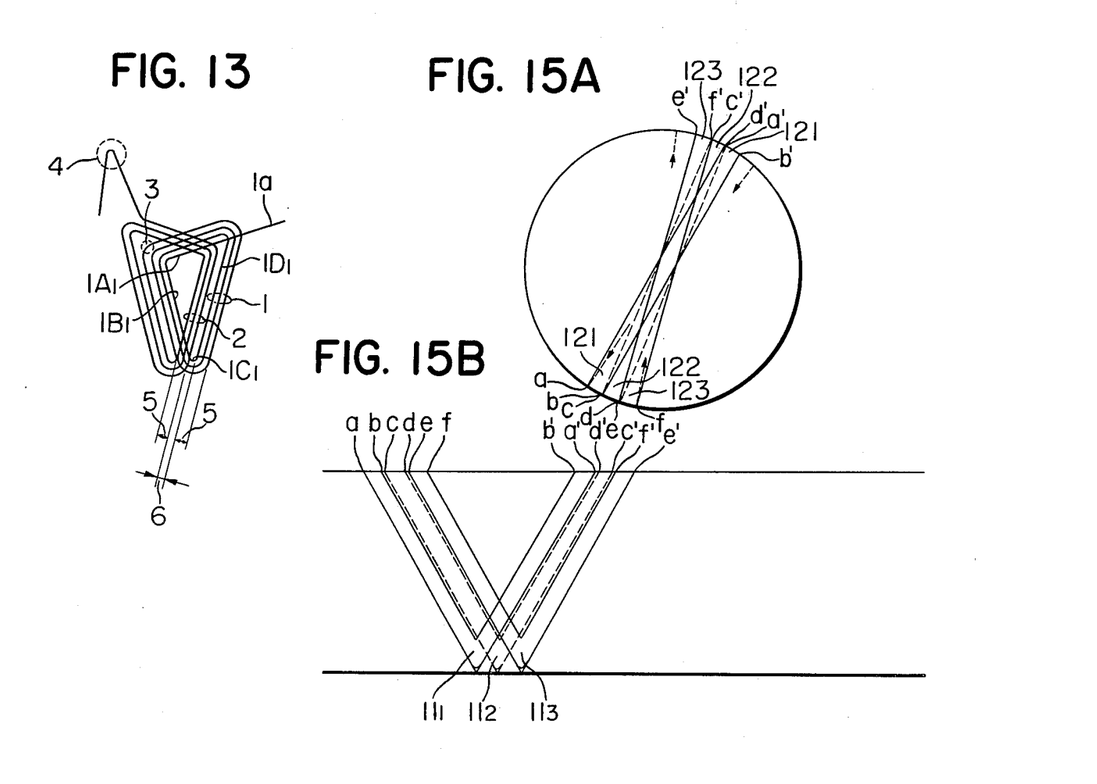
FIG. 13 shows the end connection part between adjacent windings in a coil formed according to the present invention, especially lead wire portion of the end connection part leading to commutator segments.
FIG. 15A is a plan view of the coil body shown in FIG. 14.
FIG. 15B is an expanded view of the same.

Referring first to FIGS. 12 and 13, an embodiment of the present invention is described. FIG. 12 illustrates the manner of winding of a coil element in a revolving coil according to the invention and FIG. 13 illustrates the manner of connection between two adjacent coil elements, together with a lead wire portion to a commutator segment. In FIG. 13, the reference numeral 1 designates a first conductor group and 2 is a second conductor group. Extending from the first conductor group to the second one is a transition part. The first group 1 comprises three coil windigs the starting end of which is indicated by 1a. Each of the three windings has an end connection part $1A_1$, an inclined winding part $1B_1$ (going side), a turning-back part $1C_1$ and an inclined part $1D_1$. In other words, a passage of conductor wire along the course of $1A_1$-$1B_1$-$1C_1$-$1D_1$ forms one winding and in the shown example, three such windings constitute the first conductor group. In each the conductor group, space 5 between lines is closed as a result of close contact of the lines with each other. Also, space 6 between two conductor groups 1 and 2 is closed in a manner of close contact at a processing step carried out after winding.

Figure 14:
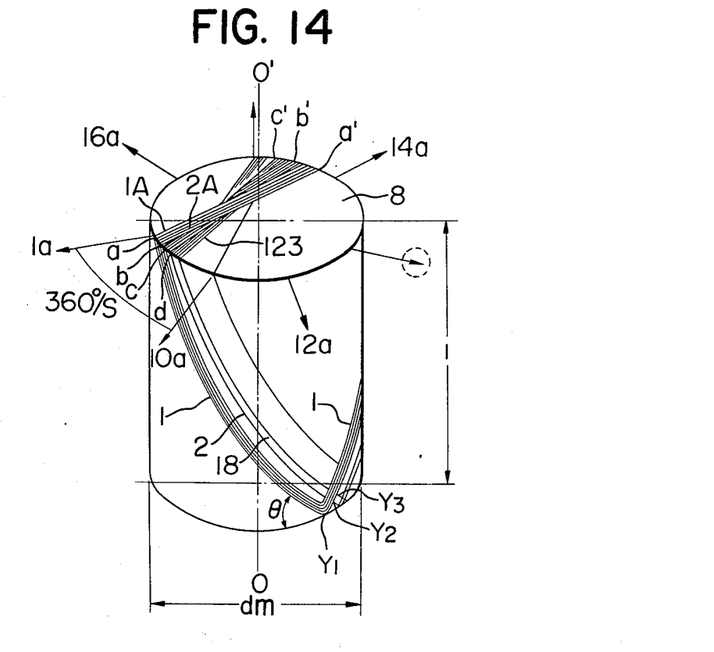
FIG. 14 is a perspective view of an embodiment of a coil according to the present invention showing the manner of winding used therefor.

According to one embodiment of the present invention, a coreless revolving coil body is formed in the manner shown in FIG. 14.

In FIG. 14, the rotation axis of the coil body is indicated by o—o', its average diameter by dm, its length by and angle of spiral winding is indicated to $\theta$. As seen in the drawing, a wire has its start point at a position a on the cylindrical body and at first goes to a turning-back point $Y_1$ from the start point a spirally along the cylinder surface with spiral angle $\theta$. After turning back at $Y_1$, the wire goes also spirally along the cylinder surface at the backside up to a position a' lying on the outer circumferential edge of one end surface 8 of the body. From the point a' the wire further extends to a point b next to the start point a across the end surface 8 in such manner as to describe a chord a'-a. This winding of wire passing through the course of a-Y-a'-a is repeated many times as desired to form a first conductor group as shown in FIG. 13.

After the first conductor group 1 being formed, the second conductor group 2 is formed in a similar manner starting from a point close to the above mentioned start point a' and passing through again the end connection part 8. At the time of the second conductor group being formed, however, the direction of winding in which the wire extends from point a' to b' across the end connection part is shifted by a predetermined angle.

In FIG. 14, the end connection part of the first conductor group 1 is indicated by 1A and that of the second group 2 by 2A. 10a, 12a, 14a and 16a designate lead wire portions for segment connection. Inclined wire parts 1, 2, 18, ... of the conductor groups as well as end connection wire parts 1A, 2A, ... of the conductor groups are arranged in parallel to each other so as not to cross each other.

FIG. 15A is a plan view of the coil body shown in FIG. 14 and FIG. 15B is an expanded view of the same.

After windings have been formed all around the body, the inclined wire parts 1, 2, 18, ... of all the groups are contacted closely with each other by a shaping processing to eliminate any space between winding lines and to form a uniform and complete coil body.

Now, the effects of the present invention are described comparing the winding according to the invention with the prior art one.

As previously described, when one wishes to make a motor having a desired motor characteristic at an applied voltage V, this may be attained by suitably selecting the values of torque constant K and resistance R. Since $K \sim Z\Phi$ and $\Phi$ is constant for a given motor, $K \sim Z$. This means that the desired motor characteristic is obtainable by suitably selecting Z under the condition of a suitable resistance R. It a coil is formed according to the prior art of the above mentioned Japanese Patent Application No. 22361/1974 by winding a wire of 0.3 mm in diameter at a rate of 50 turns per segment in a fashion of single row, close winding, then the width of winding space So' becomes $0.3 \times 50 = 15$ mm and the coil thickness is 0.6 mm $(0.3 \times 2 = 0.6)$. However, to reduce the revolution number of the motor, if a coil of 150 turns per segment is wished to be formed instead of that of 50 turns per segment, then it is required to use a smaller diameter of wire. Since the width of winding space So' is 15 mm, the wire diameter must be: $15 \div 150 = 0.1$ mm. Accordingly, the coil thickness becomes $0.1 \times 2 = 0.2$ mm. Thus, the coil thickness is reduced from 0.6 to 0.2 although an increase of Z (active conductor lines per segment) up to 150 from 50 is attained. Since coil resistance is increased up at the inverse square of the wire diameter, the coil resistance for the latter mentioned 150 T (turns) coil becomes 27 times larger than the former as shown below.

Increase of resistance attributable to wire diameter: $3^2 = 9$ times

Increase of resistance attributable to wire length: 3 times (50T→150T)

Total increase of coil resistance: $9 \times 3 = 27$ times

On the other hand, the torque constant K in the latter case is 9 times larger than that in the former since Z becomes 3 times larger and $3^2 = 9$. Therefore, from $m \sim K^2/R$, the value of m becomes reduced to $9/27 = \frac{1}{3}$ compared with that in the former.

This remarkable decreases in m is caused by the fact that the winding space available for the given motor (coil thickness of 0.6 mm and winding width of 15 mm) can not be made full use of according to the prior art in the direction of thickness. Namely, while the winding width of 15 mm is used fully, the thickness used for the latter case is only 0.2 mm $(1.1 \times 2)$ which is mere one third of available thickness. If it were allowed to select such wire diameter with which man could obtain coil thickness of 0.6 mm after 150 turns and to wind such diameter of wire in plural layers as shown in FIG. 11, then the above decrease in m would be avoidable by employing a wire having a larger diameter at least larger than 0.1 mm. For example, if such wire having a diameter of 0.173 mm is used instead of the wire of 0.1 mm in diameter, the value of m is remained unchanged as compared with the former case of 0.3 mm diameter of wire since the resistance becomes 9 times larger than that in the former case, but at the same time the torque constant K becomes also 9 times larger.

According to the present invention, as described above, it is allowed to form a coil having a thickness three times larger than the diameter of wire then used to the same motor for which a coil having a thickness two times larger than the diameter of wire is formed according to the prior art. Therefore, by using the winding technique of the present invention, a valuable improvement in performance of motor is attained and, therefore, a substantial increase of coil strength as a revolving coil is obtained. In the above described case, the reduction of m to $\frac{1}{3}$ means that the curve (2) in FIG. 9 becomes very steep and the starting torque becomes reduced only to $\frac{1}{3}$ for the same no-load revolution number. The present invention eliminates such problem.

In general, the possibility that motor constant K may be made larger in designing a motor brings forth various advantages in addition to the improvement of m. For example, improvement of controllability, reduction of motor rising time constant and saving of electric power are also attainable. The constant K can be made larger, as described above, by increasing the value of Z. In increasing it is a key point that one holds down the increasing rate of R to a level lower than the increasing rate of Z. The present invention hits just this key point.

Figure 16A:
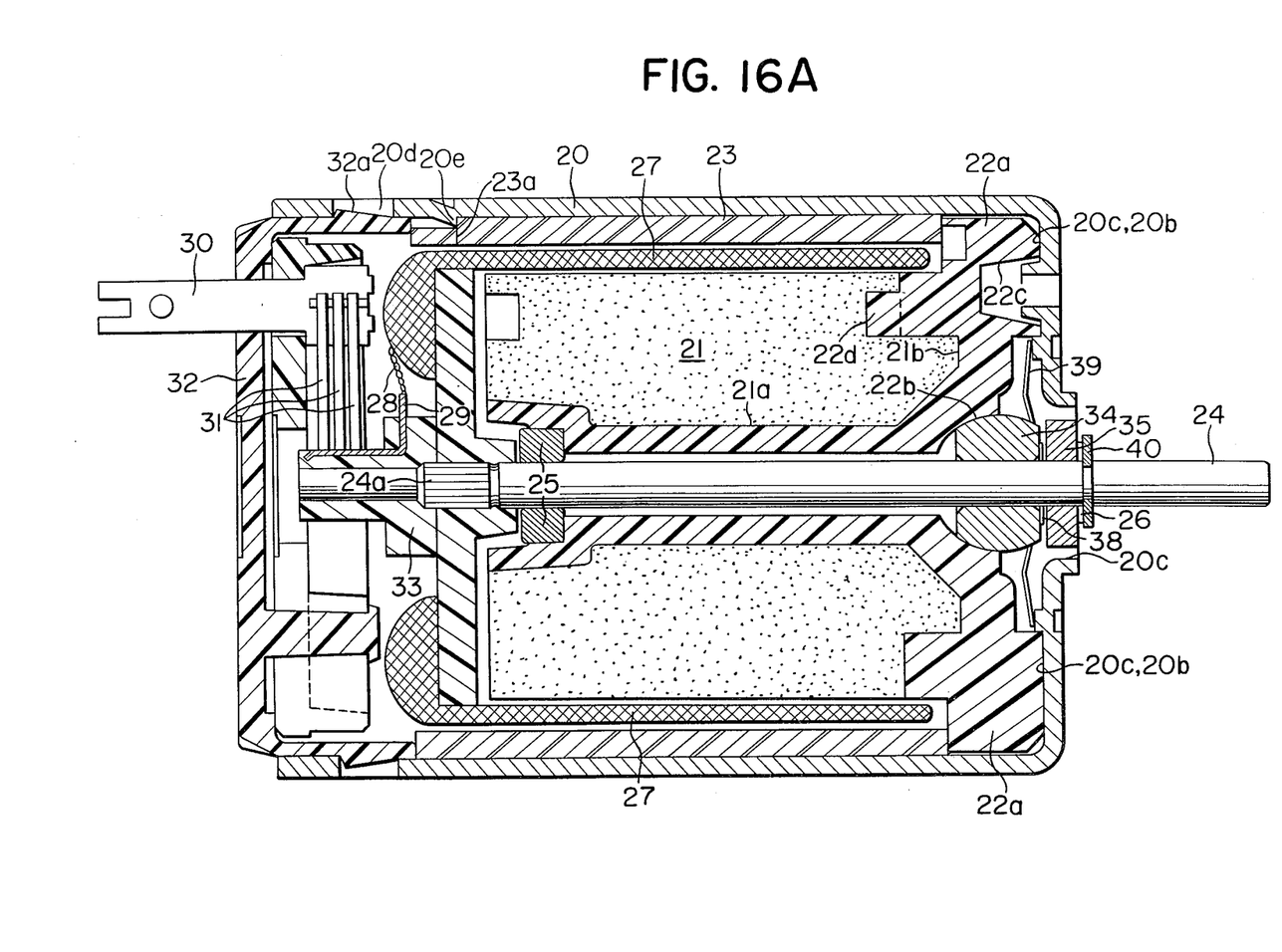
FIG. 16A is an axial sectional view of a coreless motor in which a coil formed according to the present invention is used.

FIG. 16A shows a coreless motor in which the present invention is embodied.

The coreless motor comprises the following three structural components as its main parts:
(1) stator serving also as a motor casing;
(2) motor rotor; and
(3) motor cover means.

Figure 16B:
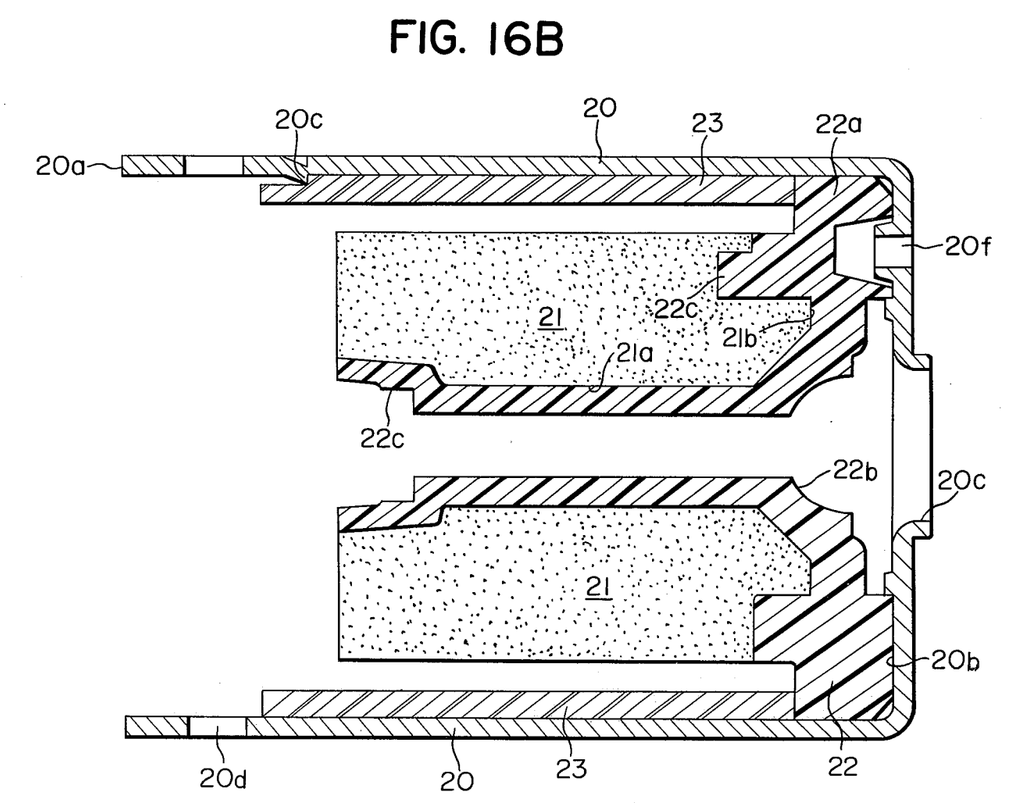
FIG. 16B is an axial sectional view of the stator of the coreless motor shown in FIG. 16A.

FIG. 16B is an axial sectional view of the stator part.

Designated by 20 is a motor casing which is made of soft magnetic material and in a shape of cylinder. At its one end 20a, the cylindrical casing 20 is open and the other end 20b is provided with an opening 20c through which a rotary shaft 24 is led out.

20d is a connecting part for connecting a motor cover with the casing. A description of the motor cover is made hereinafter. The connecting part is in a form of slot or hole formed on the circumference of the open end of the motor casing 20. Designated by 20f is an opening used for mounting the motor on an exterior part. 21 is a fixed field permanent magnet in a shape of cylinder whose inner circumferential surfaces 21a and 21b are covered by a fixing member 22 integrally formed with the permanent magnet 21 using synthetic resin material. The fixing member 22 has a flange 22a facing the side wall 20b of the casing and a bearing ball seat 22b formed to receive a self-aligning bearing 34. At the other end of the fixing member 22 there is formed also a bearing receiving portion 22e to receive a bearing 25. The fixing member 22 is fixed to the motor casing 20 through a member 23 as later described, with its end at the side of 22b abutting against the side wall 20b of the casing.

Designated by 23 is an auxiliary yoke for the stator. The auxiliary yoke 23 is inserted into the casing 20 to form a magnetic path together with the casing. The auxiliary yoke is in a shape of cylinder and its one end 23a abuts against a portion of the fixing member 22. The other end 23b of the yoke is engaged with and held by a projection 20e of the motor casing.

A portion 22c of the fixing member 22 projects into the magnet 21 so as to form a stopper against rotation.

Figure 16C:
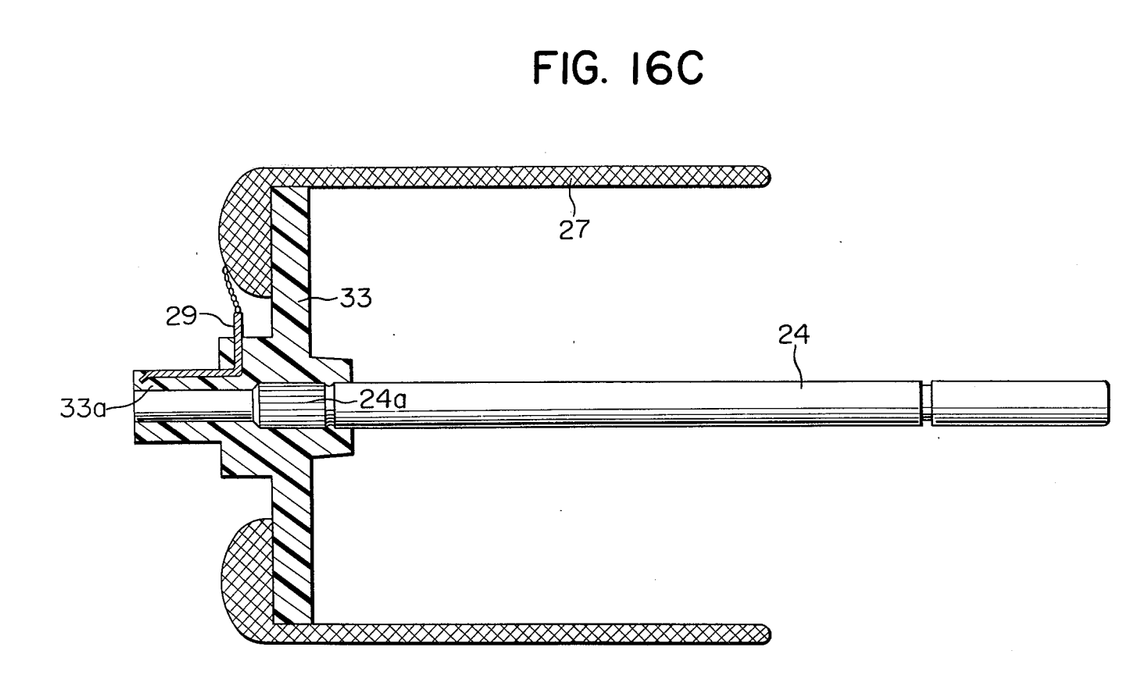
FIG. 16C is an axial sectional view of the rotor of the coreless motor.

FIG. 16C is a sectional view of the rotor. The rotary shaft 24 of the motor is received in the above described stator through bearings 25 and 34 for rotation. The rotary shaft has a knurled portion 24a on which a coil fixing member 33 is secured. The coil fixing member 33 is made of synthetic resin material. A cup-shaped coil 27 is fixed to the coil fixing member 33 at a portion of the inner circumference of the coil.

Designated by 29 is a commutator which is fixed onto an axial extension 33a of the coil fixing member 33 by moulding. One end of the commutator 29 is exposed to allow an electrical contact with a power supplying brush and the other end is connected to a power supply lead wire of the coil 27.

The manner of assembling the coreless motor shown in FIG. 16 is as follows:

A bearing metal (36 in FIG. 16A) is mounted on the stator already assembled in the manner shown in FIG. 16B and then the rotor shown for FIG. 16C is inserted thereinto.

Thus, the rotary shaft 24 is aligned with the permanent magnet 21 and supported rotatably through the bearings 25 and 34. In a space provided between the permanent magnet 21 and the yoke 23 there is inserted the coil 27.

From the right end side of the shaft 24, a spacer ring 38 and a stop ring 35 are pushed into along the shaft and then they are secured by a washer 40. The spacer ring 38 is used for size adjustment between the bearing 34 and the motor casing 20. The function of the stop ring 35 is to prevent bonding agent from flowing into the bearing when pulley or the like is bonded to the motor output shaft. A spring member 39 serves to urge the bearing 34 against the bearing ball seat 22b provided in the fixing member 22.

After inserting the rotor comprising rotary shaft 24, coil 27, commutator 29 and others into the stator, the opening of the motor casing 20 is closed by a cover member 32 as shown in FIG. 16A and the cover member is secured to the casing. The cover member 32 is made of synthetic resin material or metal material and has a power supplying terminal 30 fixed to the inside of the cover. The terminal 30 is led out outside of the casing so as to allow its connection to an external power source. At the other end, the power supplying terminal is connected to the above mentioned brush 31 which is, in turn, in contact with the commutator 29.

The cover member 32 fixedly holding the terminal 30 and brush 31 closes the opening of the motor casing 20 and the projection 32a of the cover member is fitted into the slot or hole 20a of the casing for fixing.

With the above described structure of coreless motor, the thickness of returning magnetic path is defined by the motor transfer 20 and the auxilary yoke 23. This structure of stator has an advantage that when it is wished to increase the thickness of coil 27, such change can be carried out very easily only by altering the thickness of the auxiliary yoke 23. It is unnecessary to change the motor structure as a whole. This structural advantage is also applicable when the material of permanent magnet 21 has to be changed.

While the invention has been particularly shown and described with reference to preferred embodiments thereof, it will be understood by those skilled in the art that the foregoing and other changes in details can be made therein without departing from the spirit and scope of the invention.

What I claim is:

1. A rotary coil for use in a coreless motor comprising:
   (a) a plural number of first coil groups including
      a first inclined coil part formed by winding a wire conductor for a rotary coil of said coreless motor in such manner that, to form a coil body in a shape of cup with one open end and another closed end constituted of an end connection part being a portion of said rotary coil, a winding extends obliquely from one point on one edge of a cylindrical circumferential surface of said coil body to another thereof at a predetermined inclination relative to a generatrix of said coil body,
      a second inclined coil part formed by winding said wire conductor in such manner that said winding is turned back at a position in the vicinity of said open end and extends obliquely toward an edge nearly opposed to said one edge of said cylindrical circumferential surface of said coil body, and
      an end connection part for making a connection of said inclined coil parts across the area of the end surface of said cup-shaped body, and formed by winding said inclined coil parts and an end connection part a plural number of times at the same position in layer with the same number of turns so as to form said cup-shaped rotary coil;
   (b) a plural number of second coil groups including
      a transition part for changing the winding direction of each coil group relative to an adjacent one by a predetermined displacement angle,
      a first inclined coil part formed by winding in such manner that said winding extends obliquely from a point displaced by a predetermined angle relative to said first coil group at said transition part along the upper periphery of said coil body to another point on an edge of the lower periphery thereof at a predetermined inclination,
      a second inclined coil part formed by winding in such manner that said winding is turned back at a position in the vicinity of said open end of said coil body and said winding extends obliquely toward and edge nearly opposed to said one edge of the cylindrical circumferential surface of said coil body, and
      an end connection part for making a connection of said inclined coil parts across the area of the end surface of said cup-shaped coil body, and formed by winding said inclined coil parts and said end connection part a plural number of times at the same position in layer with the same number turns so as to form said cup-shaped rotary coil; and
   (c) a lead wire part formed as a portion of said transition part and brought out from said winding at the transition from one of said coil groups to an adjacent one to connect to a commutator for supplying power to said rotary coil.

2. A rotary coil for use in a coreless motor, which includes one open end thereof and an other closed end with an end connection part being a portion of said rotary coil and is connected to a commutator including a plurality of segments, comprising:
   (a) a plurality number of first coil groups including,
      a first inclined coil part formed by winding in such manner that a winding extends obliquely from one edge of a cylindrical circumferential surface of said coil body to another edge thereof at a predetermined inclination relative to a generatrix of said coil body,
      a second inclined coil part formed by winding in such manner that said winding is turned back at a position in the vicinity of said open end and extends obliquely toward an edge nearly opposed to said one edge of said cylindrical circumferential surface of said coil body, and
      an end connection part for making a connection of said inclined coil parts across of the end surface of said cup-shaped coil body, and formed by winding said inclined coil parts and an end connection part a plural number of times at the same position in layers with the same number of turns so as to form said cup-shaped rotary coil;
   (b) a plural number of second coil groups including,
      a transition part for changing the winding direction of each coil group relative to an adjacent one by a predetermined displacement angle,
      a first inclined coil part formed by winding in such manner that said winding extends obliquely from a point displaced by a predetermined angle relative to said first point of said first coil group to another edge of said coil body at a predetermined inclination,
      a second inclined coil part formed by winding in such manner that said winding is turned back at a position in the vicinity of said open end of said coil body and said winding extends obliquely toward an edge nearly opposed to said one edge of the cylindrical circumferential surface of said coil body, and
      an end connection part for making a connection of said inclined coil parts across the area of the end surface of said cup-shaped coil body, and formed by winding said inclined coil parts and said end connection part a plural number of times at the same position in layer with the same number of turns so as to form said cup-shaped rotary coil; and
   (c) a plural number of lead wire parts corresponding to the number of said commutator segments, for connecting said rotary coil to said commutator for supplying power to said rotary coil and formed at the transition from each segment wound with a plural number of coil groups to an adjacent one by bringing out said winding.

* * * * *

UNITED STATES PATENT AND TRADEMARK OFFICE
CERTIFICATE OF CORRECTION

PATENT NO. : 4,323,806

DATED : April 6, 1982

INVENTOR(S) : Kanemasa Aoki

It is certified that error appears in the above—identified patent and that said Letters Patent is hereby corrected as shown below:

Column 4, line 67, "I(1/2)=1.27r1BI" to read -- T(1/2)=1.27r1BI --;

Column 5, line 65, "or" to read -- of --;

Column 6, line 12, "conneced" to read -- connected --;

Column 7, line 45, "_nd" to read -- 1 and --;

Column 7, line 45, "to" to read -- by --;

Column 8, line 24, "It" to read -- If --;

Column 8, line 54, "decreases" to read -- decrease --;

Column 9, line 27, after "increasing" insert -- Z --;

Column 10, line 19, "36" to read -- 35 --;

Column 10, line 57, "transfer" to read -- casing --;

UNITED STATES PATENT AND TRADEMARK OFFICE
CERTIFICATE OF CORRECTION

PATENT NO. : 4,323,806
DATED : April 6, 1982
INVENTOR(S) : Kanemasa Aoki

It is certified that error appears in the above—identified patent and that said Letters Patent is hereby corrected as shown below:

Column 11, line 46, "and" to read -- an --;

Column 12, line 8, "plurality" to read -- plural --;

Column 12, line 22, after "across" insert -- the area --.

Signed and Sealed this

Thirteenth Day of July 1982

[SEAL]

Attest:

Attesting Officer

GERALD J. MOSSINGHOFF
*Commissioner of Patents and Trademarks*